United States Patent [19]

Tabisz et al.

[11] Patent Number: 4,860,184
[45] Date of Patent: Aug. 22, 1989

[54] HALF-BRIDGE ZERO-VOLTAGE SWITCHED MULTI-RESONANT CONVERTERS

[75] Inventors: Wojciech A. Tabisz; Fred C. Lee; Milan M. Jovanovic, all of Blacksburg, Va.

[73] Assignee: Virginia Tech Intellectual Properties, Inc., Blacksburg, Va.

[21] Appl. No.: 249,930

[22] Filed: Sep. 27, 1988

Related U.S. Application Data

[63] Continuation-in-part of Ser. No. 99,965, Sep. 23, 1987, which is a continuation-in-part of Ser. No. 179,926, Apr. 11, 1988.

[51] Int. Cl.[4] .......................................... H02M 3/335
[52] U.S. Cl. ........................................ 363/17; 363/98; 363/132
[58] Field of Search ...................... 323/259, 271, 344; 363/17, 24–26, 98, 124, 132, 133

[56] References Cited

U.S. PATENT DOCUMENTS

| | | | |
|---|---|---|---|
| 4,639,844 | 1/1987 | Gallios et al. | 363/133 X |
| 4,648,017 | 3/1987 | Nerone | 363/17 X |
| 4,679,129 | 7/1987 | Sakakibara et al. | 363/17 |
| 4,694,383 | 9/1987 | Nguyen et al. | 363/17 |
| 4,695,933 | 9/1987 | Nguyen et al. | 363/17 |
| 4,695,934 | 9/1987 | Steigerwald et al. | 363/17 |
| 4,720,667 | 1/1988 | Lee et al. | 323/271 |
| 4,720,668 | 1/1988 | Lee et al. | 323/271 |
| 4,757,432 | 7/1988 | Hancock | 363/17 |
| 4,794,506 | 12/1988 | Hino et al. | 363/17 X |

OTHER PUBLICATIONS

"Secondary Side Resonance For High Frequency Power Conversion", Liu et al, IEEE Applied Power Electronics Conference, 1986, pp. 83–89.
"Zero-Voltage Switching Technique In DC/DC Converters", Liu et al, IEEE Applied Power Electronics Conference, 1986, pp. 58–70.
"Zero-Voltage Switching Technique In High Frequency Off Line Converters", Jovanovic et al, IEEE Applied Power Electronics Conference, 1988, pp. 23–32.

Primary Examiner—Patrick R. Salce
Assistant Examiner—Emanuel Todd Voeltz
Attorney, Agent, or Firm—Mason, Fenwick & Lawrence

[57] ABSTRACT

A half-bridge zero-voltage-switched multi-resonant converter. The converter basically comprises a device for converting an input voltage signal to a DC output signal to be imposed across a load. The device includes input terminals for receiving the input signal and output terminals for imposing the DC output signal across the load. Serially connected first and second switching assemblies are connected in parallel across the input terminals. Each of the first and second switching assemblies includes a transistor switch, a diode and a capacitor all arranged in parallel. The device further includes a transformer having a primary winding and serially connected first and second secondary windings. A first rectifier in parallel with a first resonant capacitor is used to connect the first secondary winding across the output terminals. Circuitry is provided for connecting the primary winding of the transformer to the input terminals and to the serial connection between the first and second switching assemblies. In order to complete the zero-voltage-switched multi-resonant converter for off-line use, a resonant circuit is formed with the first and second resonant capacitors and the total inductance of the primary winding of the transformer.

6 Claims, 8 Drawing Sheets

HALF-BRIDGE ZERO-VOLTAGE SWITCHED MULTI-RESONANT CONVERTERS

CROSS-REFERENCE TO RELATED APPLICATION

This application is a continuation-in-part of co-pending U.S. patent application Ser. No. 99,965, filed Sept. 23, 1987, and co-pending U.S. patent application Ser. No. 179,926, filed Apr. 11, 1988, entitled "ZERO-VOLTAGE-SWITCHED MULTI-RESONANT CONVERTERS INCLUDING THE BUCK AND FORWARD TYPE", both of which are incorporated herein by reference.

FIELD OF THE INVENTION

The present invention relates to DC/DC converters, in general, and to a half-bridge zero-voltage multi-resonant converter, in particular. The new converter overcomes the problems of quasi-resonant circuits and allows operation at high frequency with performance enhanced characteristics.

BACKGROUND OF THE INVENTION

For many years, power processing and conditioning circuitry and systems used a linear technique to regulate output voltage. Under this technique, the output voltage of a power supply is regulated by deliberate dissipation of some of the energy entering the power supply. The energy is dissipated in a semiconductor device, typically a bipolar junction transistor operating in the linear (active) region. Prior art linear power supplies achieve low operating efficiencies of about 50%. Low operating efficiency is manifested by excessive heating of the semiconductor device. To maintain the temperature of the semiconductor device within prescribed specifications, a large and heavy heat sink is required.

Linear power supplies employ conventional 50/60 Hz power transformers followed by a rectifier, filter and linear regulator. Because of the low frequency of processing, the transformer, as well as filter components, are large and heavy.

Miniaturization of the electronic equipment requires reduction of the size and weight of the power supplies used in that equipment. This is achieved by using switch-mode power supplies with semiconductor devices operating as electronic switches. By principle of operation, there is no deliberate power dissipation in the switching devices. Thus, the switch-mode power supplies are capable of high efficiency. For example, in practical circuits efficiency of 80% is achieved. In switch-mode power supplies the power processing is performed at much higher frequency than in linear power supplies, for example, at 20 or 100 kHz. This results in substantial reduction of the size of the transformer and filter components.

One of the simplest switch-mode DC/DC power converters is the pulse width modulated (PWM) buck converter, shown in FIG. 1A with its operating waveforms shown in FIG. 1B. In FIG. 1B, the first graph shows the on/off states of switch S, the second graph shows the current through switch S, the third graph shows the voltage across switch S, the fourth graph shows the current through the diode D and the fifth shows the voltage across diode D. Switch S is typically implemented using a power metal oxide semiconductor field effect transistor (MOSFET) or bipolar junction transistor (BJT). Inductor $L_F$ and capacitor $C_F$ form an output filter. Resistor $R_L$ represents a load to which power is delivered.

Switch S is periodically closed and open. When S is closed, the input voltage $V_{IN}$ is applied to the diode D. The diode is reverse biased and does not conduct current. During this time (one-time), energy is delivered to the circuit from $V_{IN}$ and stored in the filter components $L_F$ and $C_F$. When switch S is open, the inductor current is diverted from the switch to the diode, and the diode is turned on. During this time (off-time), the filter components release the energy stored during the on-time into the load. The regulation of the output voltage $V_O$ *is achieved by varying the ratio of the on-time to the off-time.*

Reduction of the size and weight of the switching power supply can be achieved by increasing the switching frequency. However, as the switching frequency increases, so do the switching losses in the switching device. Typically, switching losses increase proportionally to the frequency.

Switching losses can be divided into two categories: turn-off and turn-on losses. The turn-off losses are caused by simultaneous non-zero-voltage and non-zero-current applied to the switching device during turn-off. These losses can be reduced by reducing the turn-off time, which can be achieve by using fast switching transistors and appropriate drive circuits.

Turn-on losses, on the other hand, are caused by dissipation of the energy stored in the parasitic capacitance which exists in parallel with the switching device. This energy is completely dissipated in the switching transistor during turn-on. The turn-on power loss depends only on the energy stored in the parasitic capacitance and switching frequency and is not affected by the switching speed of the device.

Reduction of switching losses also can be achieved by applying certain of the concepts of resonant switching. One concept of resonant switching involves the use of quasi-resonant switches.

Two types of quasi-resonant switches have been introduced: A zero-current quasi-resonant switch as shown in FIG. 2A, and a zero-voltage quasi-resonant switch as shown in FIG. 2B. The two types of quasi-resonant switches are considered in co-pending U.S. patent applications Ser. Nos. 856,775; 877,184 and 877,185, incorporated by reference herein. In the zero-current quasi-resonant switch, the resonant components, $L_R$ and $C_R$, shape the current through the switch S so that the current becomes zero prior to turn-off of the switch S. This reduces the turn-off losses. In the zero-voltage quasi-resonant switch, the resonant components shape the voltage across the switch S so that the voltage becomes zero prior to turn-on of the switch S.

Any PWM circuit can be converted into a quasi-resonant circuit by replacing the PWM active switch with a quasi-resonant switch. For example, FIG. 3A shows a buck zero-current-switched quasi-resonant converter with its operating waveforms shown in FIG. 2B. The arrangement of the waveforms in FIG. 3B is similar to the arrangement in FIG. 1B. It can be seen that in the zero-current-switched converter, the current through the switch S is quasi-sinusoidal and reduces to zero before switch S is turned off. The turn-on of switch S, however, occurs with the input voltage $V_{IN}$ applied to the switch. This causes turn-on power dissipation. Maximum switching frequency of zero-current-switched quasi-resonant converters is limited to about 2 MHz.

It can be seen in FIGS. 3C and 3D, that in the zero-voltage-switched quasi-resonant converter the voltage across the active switch is quasi-sinusoidal and reduced to zero prior to turn-on of the switch. This eliminates the turn-on losses. Zero-voltage-switched quasi-resonant converters can operate at frequencies to about 10 to 20 MHz.

Zero-voltage-switched quasi-resonant converters are capable of high operating frequencies. However, they have two major limitations. One problem is excessive voltage stress to the switching transistor. This voltage stress is proportional to the load range which makes it difficult to implement zero-voltage-switched quasi-resonant converters in applications where load varies over a wide range.

Another problem is caused by the parasitic junction capacitance of the rectifying diode D (see FIG. 3C). Theoretical zero-voltage-switched quasi-resonant circuits do not include capacitance in parallel with the rectifying diode. The theoretical voltage across the diode is in the form of a quasi-square wave. In practice, the junction capacitance of the rectifier does not allow for such abrupt changes of the voltage. As a result, parasitic oscillations of the resonant inductance and rectifier's capacitance occur in the circuit. If damped, these oscillations cause power dissipation. If undamped, they adversely effect voltage gain of the converter which makes the converter difficult to control.

There is thus a need for a miniature DC/DC converter capable of operating at high frequency with reduction of voltage stress to the switching transistor, increase of the load range and reduction of the switching frequency range. The present invention is directed toward filling that need.

SUMMARY OF THE INVENTION

The present invention relates to the use of a novel multi-resonant switch concept to generate families of zero-current-switched and zero-voltage-switched multi-resonant converters. The zero-voltage-switched multi-resonant converters are particularly suitable for high-frequency on-board power supplies operating at high frequencies (10 MHz) and are superior to zero-voltage-switched quasi-resonant converters since, by taking advantage of an additional resonance, the inventive converters achieve several advantageous features. A preferred embodiment of the invention relates particularly to a half-bridge zero-voltage-switched multi-resonant converter.

Most pulse width modulated (PWM) converters include active and passive switches that operate in pairs. When the active switch is closed, the passive switch is open and vice-versa. Such pairs can be extracted from a circuit and represented as a three-terminal, two-switch device. Multi-resonant switches consist of this three-terminal PWM device and three reactive components that form a resonant circuit. Zero-current multi-resonant switches, as shown in FIG. 5A, contain two resonant inductors, $L_S$ and $L_D$ and a resonant capacitor, $C_R$. Zero-voltage-switched multi-resonant switches, as shown in FIG. 5B, contain two resonant capacitors, $C_S$ and $C_D$ and a resonant inductor, $L_R$.

Multi-resonant converter circuits are generated by replacing the three-terminal PWM switches in a PWM circuit with a multi-resonant switch. For example, if the three-terminal PWM switch in a buck converter is replaced with a zero-current multi-resonant switch, a buck zero-current-switched multi-resonant converter results. In a similar fashion, a buck zero-voltage-switched multi-resonant converter is generated using a zero-voltage multi-resonant switch in a conventional buck converter.

It is thus a primary object of the present invention to provide a DC/DC converter employing multi-resonant switches.

It is still an object of the present invention to provide a half-bridge zero-voltage-switched multi-resonant converter that includes operation of both switching devices with quasi-sinusoidal voltage waveforms and zero-voltage transitions between on and off states.

It is another object of the invention to provide a half-bridge zero-voltage-switched multi-resonant converter exhibiting increased load range.

It is a further object of the invention to provide a half-bridge zero-voltage switched multi-resonant converter operating from no-load to full-load.

It is yet another object of the invention to provide a multi-resonant converter where most parasitic reactances (including output capacitance of the active switch, junction capacitance of the diode and leakage inductance of a transformer) can be included in the resonant circuit.

It is still an object of the invention to provide a half-bridge zero-voltage-switched multi-resonant converter possessing a reduced switching frequency range.

These and other objects and advantages will become apparent when the following drawings are viewed in connection with the detailed explanation to follow.

DETAILED DESCRIPTION OF THE PREFERRED EMBODIMENTS

Figure 1A:
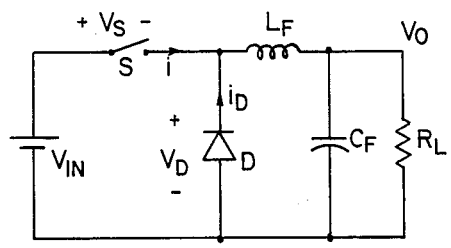
FIG. 1A is a schematic circuit diagram of a prior art PWM buck converter.

In describing a preferred embodiment of the invention illustrated in the drawings, specific terminology will be resorted to for the sake of clarity. However, the invention is not intended to be limited to the specific terms so selected and it is to be understood that each specific term includes all technical equivalents which operate in a similar manner to accomplish a similar purpose.

Figure 4:
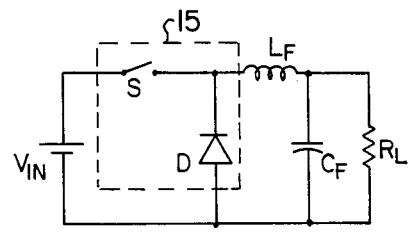
FIG. 4 is a schematic circuit diagram of a three-terminal PWM switch in a buck converter.
Figure 5A:
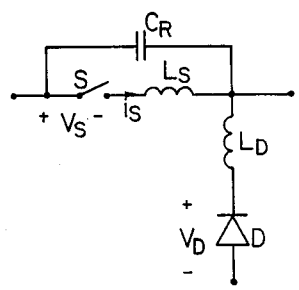
FIG. 5A is a schematic circuit diagram of a zero-current multi-resonant switch.

Most pulse width modulated (PWM) converters include active and passive switches that operate in pairs. The term "active switch" typically refers to a controlled transitor whereas "passive switch" typically refers to a diode. When the active switch is closed, the passive switch is open and vice-versa. Such pairs can be extracted from a circuit and represented as a three-terminal, two-switch device. For example, FIG. 4 shows a PWM buck converter with the three-terminal PWM switch 15 being outlined in phantom. Multi-resonant switches consist of this three-terminal PWM device 15 and three reactive components that form a resonant circuit. Zero-current multi-resonant switches, as shown in FIG. 5A, contain two resonant inductors, $L_S$ and $L_D$ and a resonant capacitor, $C_R$. An active switch S is in series with resonant inductor $L_S$. The switch S and inductor $L_S$ are in parallel with resonant capacitor $C_R$. The other resonant inductor $L_D$ is connected at one end to the node 17 formed by the connection of capacitor $C_R$ and inductor $L_S$. The other end of inductor $L_D$ is connected to the cathode of diode D.

Figure 5B:
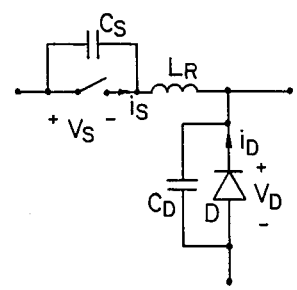
FIG. 5B is a schematic circuit diagram of a zero-voltage multi-resonant switch.

Zero-voltage-switched multi-resonant switches, as shown in FIG. 5B, contain two resonant capacitors, $C_S$ and $C_D$ and a resonant inductor, $L_R$. An active switch S is in series with resonant inductor $L_R$ and in parallel with resonant capacitor $C_S$. The cathode of diode D is connected to one end of inductor $L_R$. A second resonant capacitor $C_D$ is in parallel with diode D.

Figure 1B:
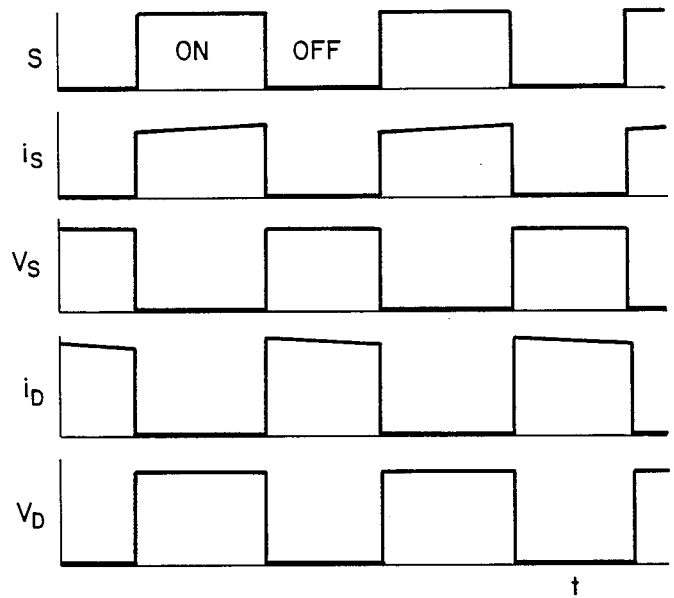
FIG. 1B shows the operating waveform of the PWM buck converter of FIG. 1A.
Figure 2A:
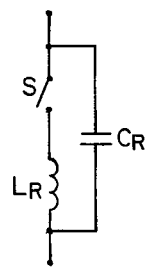
FIG. 2A is a schematic circuit diagram of a prior art basic zero-current mode quasi-resonant switch.
Figure 2B:
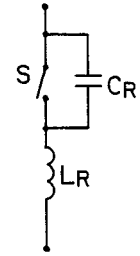
FIG. 2B is a schematic circuit diagram of a prior art basic zero-voltage mode quasi-resonant switch.
Figure 3A:
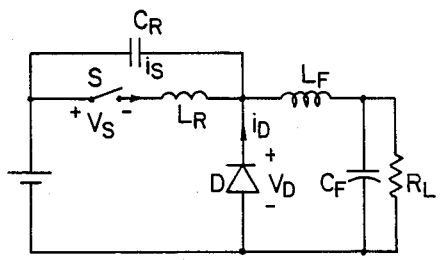
FIG. 3A is a schematic circuit diagram of a prior art zero-current-switched quasi-resonant buck converter.
Figure 3C:
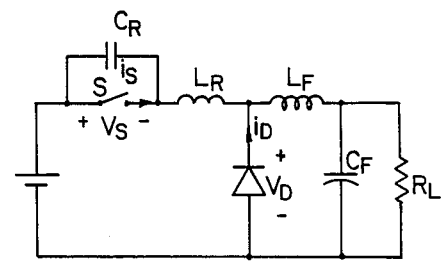
FIG. 3C is a schematic circuit diagram of a prior art zero-voltage-switched quasi-resonant buck converter.
Figure 3B:
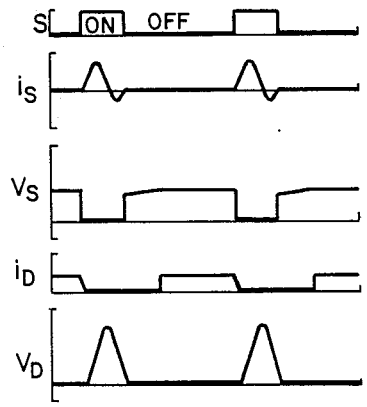
FIG. 3B shows the operating waveforms of the zero-current-switched quasi-resonant buck converter of FIG. 3A
Figure 3D:
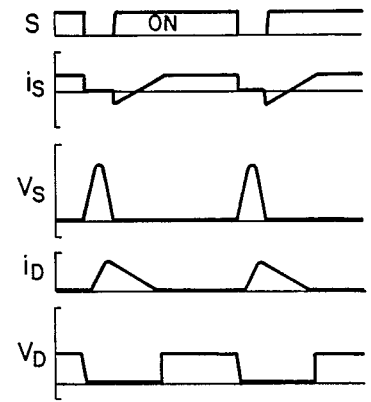
FIG. 3D shows the operating waveforms of the zero-voltage-switched quasi-resonant buck converter of FIG. 3C.
Figure 6A:
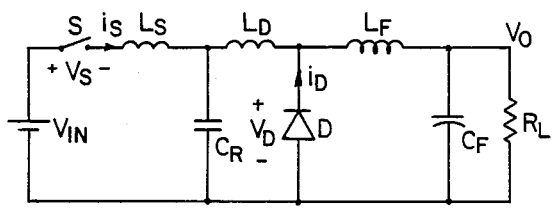
FIG. 6A is a schematic circuit diagram of a zero-current-switched multi-resonant buck converter incorporating the teachings of the present invention.

Multi-resonant converter circuits are generated by replacing the three-terminal PWM switches in a PWM circuit with a multi-resonant switch. For example, if the three-terminal PWM switch in FIG. 4A is replaced with the zero-current multi-resonant switch of FIG. 5A, a buck zero-current-switched multi-resonant converter, as shown in FIG. 6A with its waveforms in FIG. 6B, is generated. The arrangement of the waveforms in FIG. 6B is similar to the arrangement in FIG. 1B. In a similar fashion, the buck zero-voltage-switched multi-resonant converter, as shown in FIG. 6C with its waveforms in FIG. 6D, is generated using the multi-resonant switch of FIG. 5B.

Figure 6C:
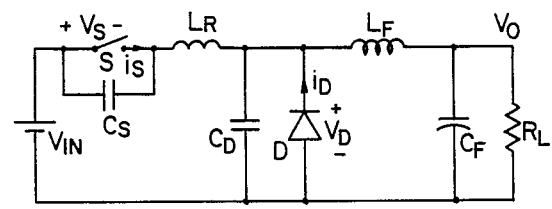
FIG. 6C is a schematic circuit diagram of a zero-voltage-switched multi-resonant buck converter incorporating the teachings of the present invention.
Figure 6B:
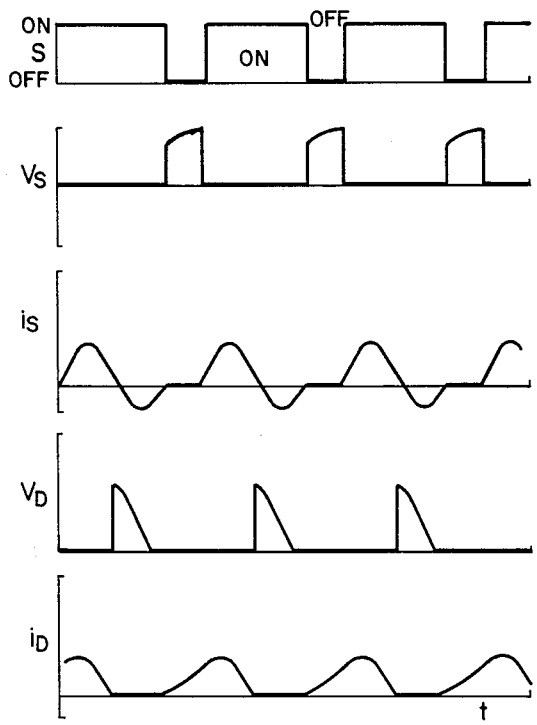
FIG. 6B shows the waveforms of the multi-resonant buck converter of FIG. 6A.
Figure 6D:
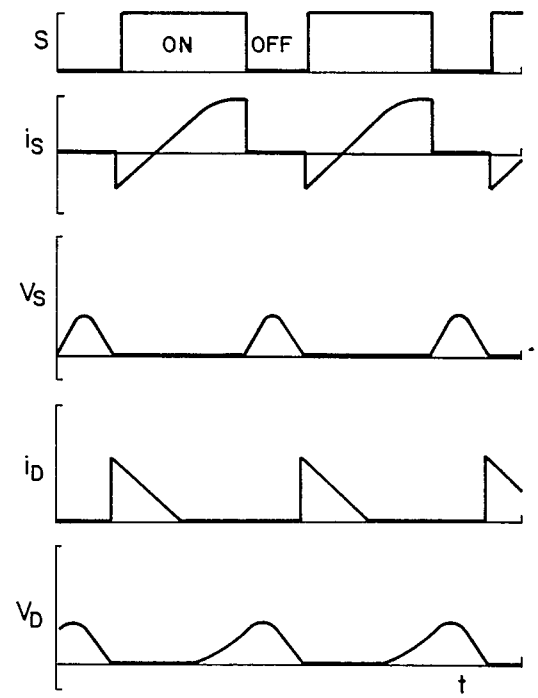
FIG. 6D shows the waveforms of the multi-resonant buck converter of FIG. 6C.

The buck zero-voltage-switched multi-resonant converter of FIG. 6C basically comprises a voltage source $V_{IN}$ connected in series with a parallel arrangement of an active switch S and a capacitor $C_S$. This arrangement is, in turn, connected in series with an inductor $L_R$.

The series arrangement of the voltage source switch and inductor are in parallel with a capacitor $C_D$. In addition, a diode D is arranged in parallel with the capacitor $C_D$. The cathode of the diode is connected to one end of an inductor $L_F$ which together with a capacitor $C_F$ form a filter. A resistor $R_L$ is connected in parallel with the capacitor $C_F$ to form a load.

It can be seen in FIGS. 6A and 6B, that in a zero-current-switched multi-resonant converter, current $i_S$ through the active switch S and current $i_D$ through the passive switch (diode D) are quasi-sinusoidal and reduced to zero at turn-off. Similarly, it can be seen in FIGS. 6C and 6D, that in the zero-voltage-switched multi-resonant converter, voltage $V_S$ across the active switch S and voltage $V_D$ across the diode D are quasi-sinusoidal and have smooth transition between the on and off states.

Figure 7A:
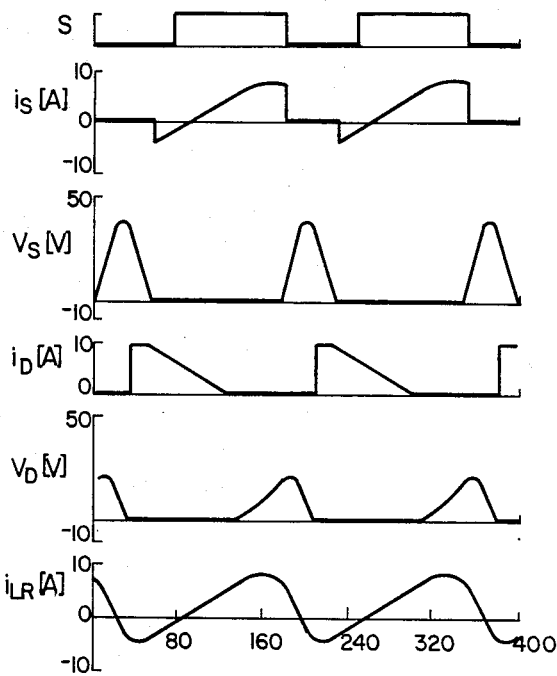
FIG. 7A shows the waveforms of the zero-voltage-switched multi-resonant buck converter of FIG. 6C at an output power level of 25 W.
Figure 7B:
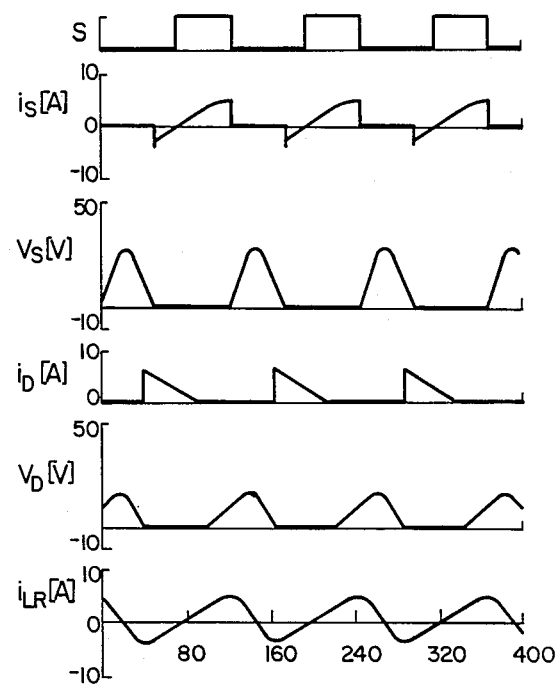
FIG. 7B shows the waveforms of the zero-voltage-switched multi-resonant buck converter of FIG. 6C at an output power level of 10 W.
Figure 7C:
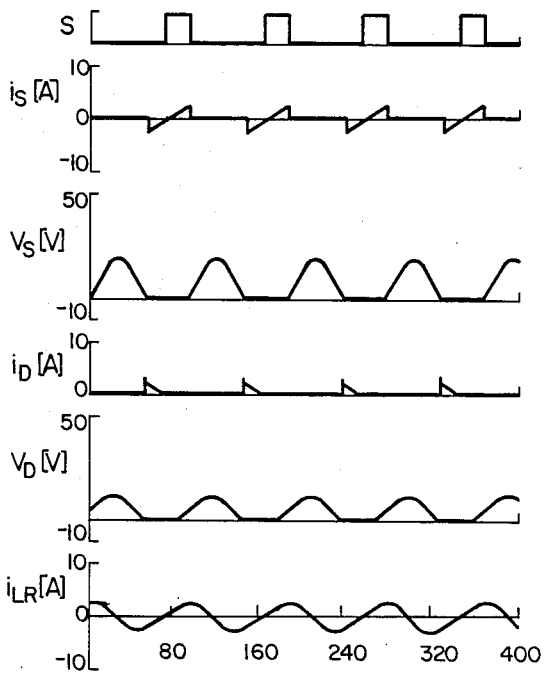
FIG. 7C shows the waveforms of the zero-voltage-switched multi-resonant buck converter of FIG. 6C at an output level of 2 W.
Figure 7D:
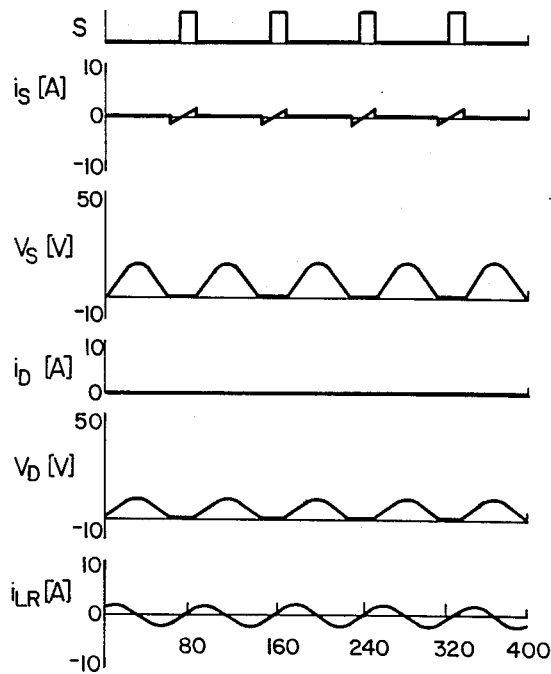
FIG. 7D shows the waveforms of the zero-voltage-switched multi-resonant buck converter of FIG. 6C at an output power level of 0 W (no load).

FIGS. 7A through 7D show waveforms for a buck zero-voltage-switched multi-resonant converter at different levels of output power. In FIG. 7A the output power level is 25 W; in FIG. 7B the level is 10 W; in FIG. 7C the level is 2 W and in FIG. 7D the level is 0 (no load). The multi-resonant converter used to generate the waveforms of FIGS. 7A through 7D is similar to that of FIG. 6C with $C_S=2.5$ $_nF$, $C_D=5$ $_nF$, $L_R=100$ $_nH$, $V_{IN}=12$ V and $V_O=5$ V. It can be seen that no matter what the output power is, both switches have quasi-sinusoidal voltage waveforms and smooth transitions at turn-off and turn-on. This is a significant improvement over zero-voltage-switched quasi-resonant converters since the latter lose the zero-voltage switching property at light loads.

Figure 8A:
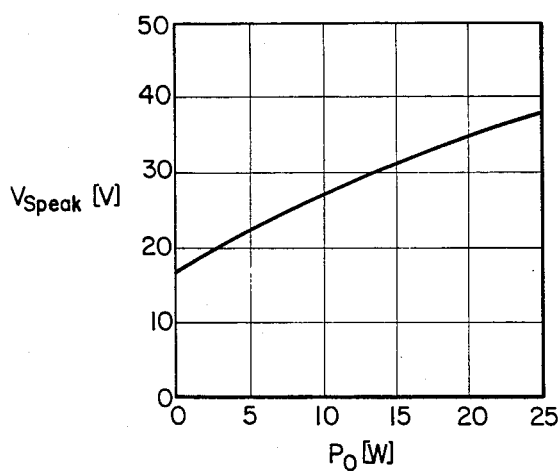
FIG. 8A is a graph that indicates voltage stress at the active switch in the buck zero-voltage-switched multi-resonant converters as a function of output power.

One of the important advantages of zero-voltage-switched multi-resonant converters is reduction of voltage stress to the switching transistor. FIG. 8A shows transistor peak voltage as a function of output power for a buck zero-voltage-switched multi-resonant converter. The maximum transistor voltage stress, $V_{smax}=38$ V, occurs at full-load and is only 3.17 times higher than the input voltage. As mentioned, in buck zero-voltage-switched quasi-resonant converters, transistor voltage stress is proportional to the load range. For example, for a load range of 10:1, it would be 11 times the input voltage. It can be seen that zero-voltage-switched multi-resonant converters offer substantial reduction of the transistor voltage stress and significant increase of the load range.

Figure 8B:
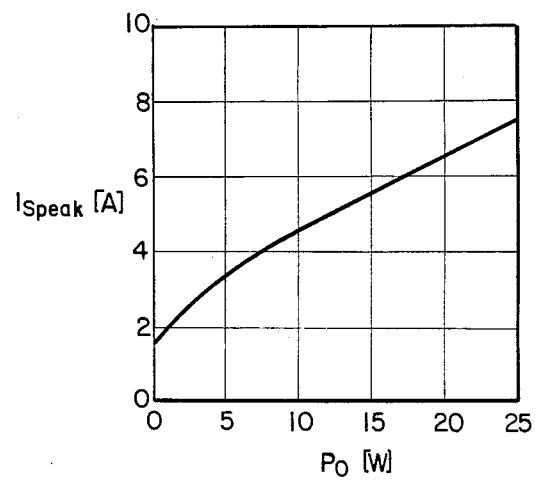
FIG. 8B is a graph that indicates current stress at the active switch in the buck zero-voltage-switched multi-resonant converter as a function of output power.

Due to additional resonance, transistor current stress in zero-voltage switched multi-resonant converters is higher than that in zero-voltage-switched quasi-resonant converters. Transistor peak current as a function of output power is shown in FIG. 8B. The maximum transistor current stress, $I_{Smax}=7.6$ A$=1.52I_O$, occurs at full-load and is 1.52 times higher than that found in buck zero-voltage-switched quasi-resonant converters. Increased current stress may cause increased conduction losses in the transistor. However, due to reduction of the voltage stress, a low-voltage MOSFET with low on-resistance can be used and conduction losses can be reduced.

Figure 8C:
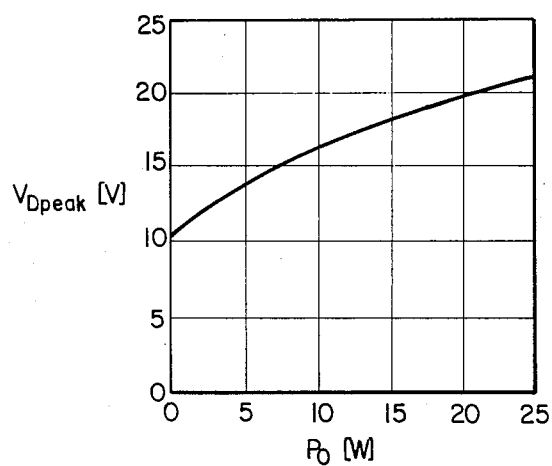
FIG. 8C is a graph that indicates voltage stress at the rectifier in the buck zero-voltage-switched multi-resonant converter as a function of output power.
Figure 8D:
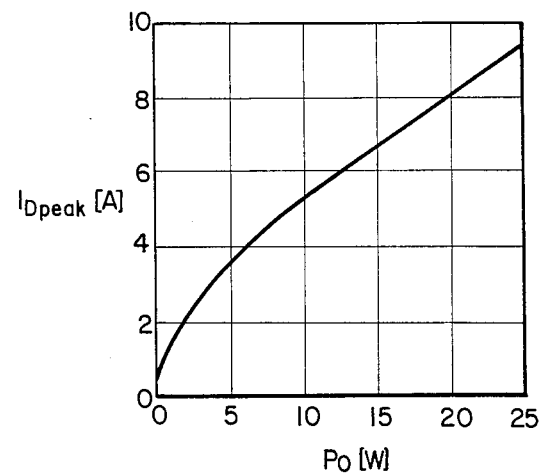
FIG. 8D is a graph that indicates current stress at the rectifier in the buck zero-voltage-switched multi-resonant converter as a function of output power.

Voltage and current stresses of the diode (passive switch) in the buck zero-voltage-switched multi-resonant converter are plotted in FIGS. 8C and 8D as functions of the output power. The diode voltage stress is about 2 times the input voltage at full-load. In buck zero-voltage-switched quasi-resonant converters, theoretical voltage stress of the diode is equal to the input voltage. However, in practical zero-voltage-switched quasi-resonant converters, resonant inductance and diode junction capacitance resonate in an uncontrollable fashion, which may cause voltage stress of the diode similar or even higher than that in zero-voltage-switched multi-resonant converters. Current stress of the diode is approximately two times higher than the output current. Thus, current stress in the diode is similar to the diode current stress in buck zero-voltage-switched quasi-resonant converters.

In zero-voltage-switched multi-resonant converters, the active switch operates with a constant off-time and variable on-time. On-time is adjusted to regulate output voltage. Therefore, just like zero-voltage-switched quasi-resonant converters, zero-voltage-switched multi-resonant converters are controlled by modulation of the switching frequency.

Zero-current-switched multi-resonant converters operate with constant on-time. Regulation of the output is obtained by variation of the off-time.

Figure 9:
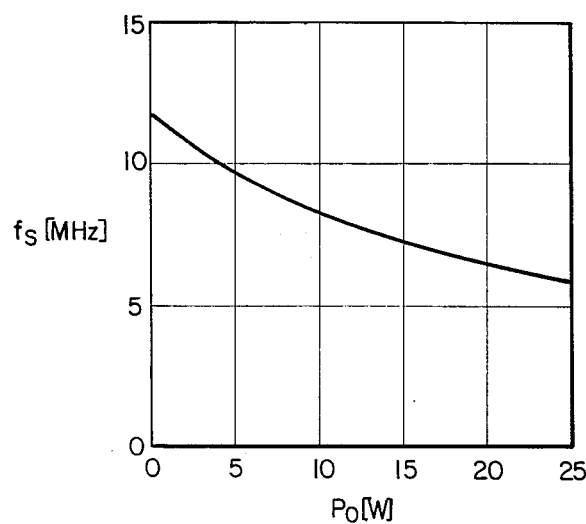
FIG. 9 is a graph that indicates the switching frequency versus the output power of the buck zero-voltage-switched multi-resonant converter.
Figure 10A:
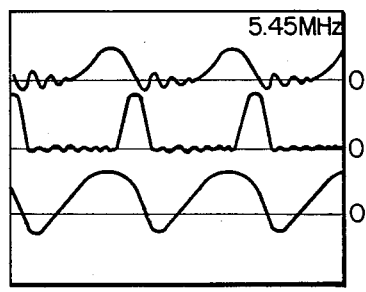
FIG. 10A shows experimental waveforms of the buck zero-voltage-switched multi-resonant converter at an output power level at 25 W.
Figure 10B:
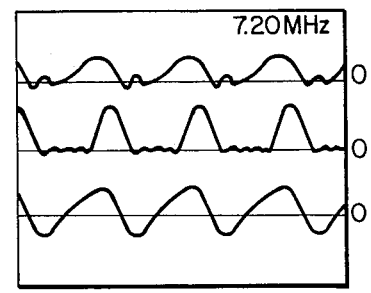
FIG. 10B shows experimental waveforms of the buck zero-voltage-switched multi-resonant converter at an output power level at 10 W.
Figure 10C:
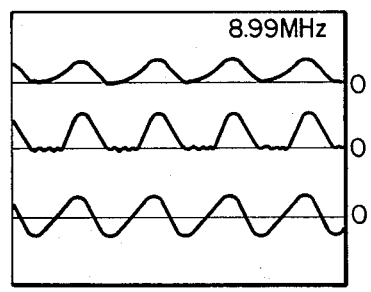
FIG. 10C shows experimental waveforms of buck zero-voltage-switched multi-resonant converter at an output power level at 2 W.
Figure 10D:
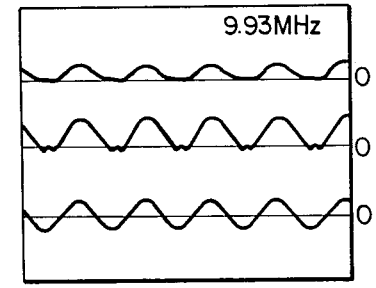
FIG. 10D shows experimental waveforms of the buck zero-voltage-switched multi-resonant converter at an output power level at 0 W (no-load).

The relationship between output power and switching frequency in the buck zero-voltage-switched multi-resonant converter of FIG. 6C is shown in FIG. 9 where $V_{IN}=12$ V and $V_O=5$ V. It can be seen that a frequency range of 2:1 provides regulation of the output voltage for the entire load range from 0 to 25 W. For comparison, a buck zero-voltage-switched quasi-resonant converter with load range 10:1 (2.5 to 25 W) requires a frequency range of 3:1. Therefore, zero-voltage-switched multi-resonant converters achieve regulation with wider load range and narrower frequency range than those of zero-voltage-switched quasi-resonant converters.

A specific embodiment of a circuit in the form of buck zero-voltage-switched multi-resonant converter of the type shown in FIG. 6C. Diode voltage, transistor voltage and resonant inductor current waveforms of the converter of FIG. 6C at different output power levels are shown in FIGS. 10A through 10D. In each illustration, the time scale along the bottom is 50 ns/division. The top trace, $V_D$, has a scale of 20 V/div. The middle trace $V_S$, has a scale of 10 V/div. The bottom trace, $i_{LR}$, has a scale of 5 A/div. It can be seen that both the transistor and the diode have quasi-sinusoidal voltage waveforms and smooth transitions between the on and off states for the full-load range. Measured values of output power, switching frequency, efficiency and voltage stresses are given in Table I.

TABLE I

| | Measured Parameters Of Buck Zero-Voltage-Switched Multi-Resonant Converters | | | |
|---|---|---|---|---|
| $P_o$ [W] | f [MHz] | n [%] | $v_{Smax}$ [V] | $v_{Dmax}$ [V] |
| 25 | 5.45 | 73 | 32 | 18 |
| 10 | 7.70 | 74 | 25 | 14 |
| 2 | 8.99 | 56 | 21 | 12 |
| 0 | 9.93 | 0 | 16 | 8 |

Figure 11:
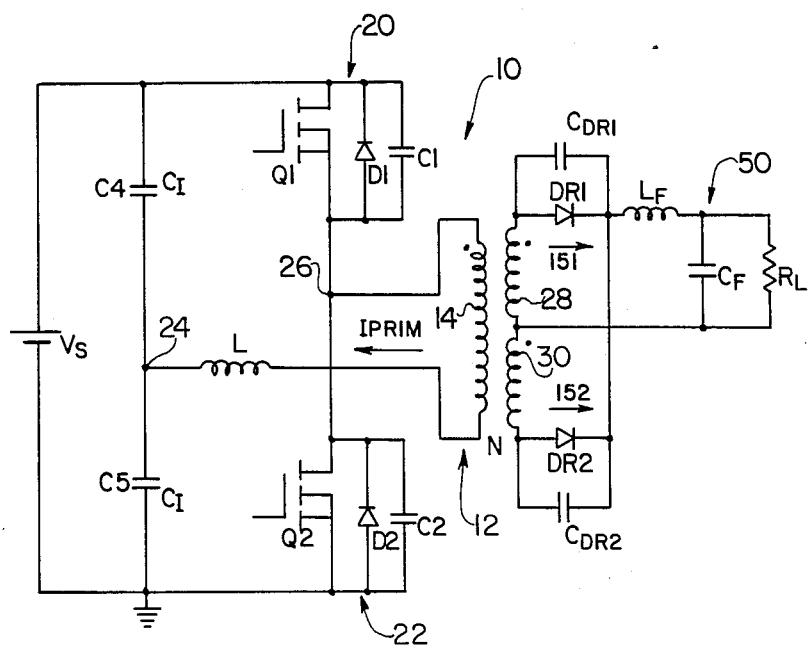
FIG. 11 is a schematic circuit diagram of a half-bridge zero-voltage-switched multi-resonant converter embodying the teachings of the present invention.

FIG. 11 shows a half-bridge zero-voltage-switched multi-resonant converter (half-bridge ZVS-MRC) 10 embodying the teachings of the present invention. In a preferred embodiment, a voltage source $V_S$ is connected in parallel with capacitors $C_4$ and $C_5$ which represent the input capacitance and are arranged in series. The voltage supply is also connected in parallel with two switching assemblies 20 and 22 which, in turn, are connected in series. Top switching assembly 20 consists of a transistor $Q_1$ in parallel with a diode $D_1$ and capacitor $C_1$. Bottom switching assembly 22 consists of a transistor $Q_2$ in parallel with a diode $D_2$ and a capacitor $C_2$. In a preferred embodiment, each of the transistor switches $Q_1$ and $Q_2$ are made up of a metal oxide semiconductor field effect transistor (MOSFET).

Capacitors $C_4$ and $C_5$ share a common connection at node 24. In turn, transistors $Q_1$ and $Q_2$ share a common connection at node 26. The primary winding 14 of a transformer 12 is connected across nodes 24 and 26. The transformer contains two secondary windings 28 and 30. Secondary windings 28 and 30 are connected through series diodes $D_{R1}$ and $D_{R2}$ to a filter inductor $L_F$ and the parallel arrangement of filter capacitor $C_F$ and load resistance $R_L$.

Resonant capacitors $C_1$ and $C_2$ represent the internal output capacitance of the MOSFET switches and any external resonant capacitances in parallel with $Q_1$ and $Q_2$, whereas diodes $D_1$ and $D_2$ represent the body diodes of the switches. L is the total inductance of the primary leakage inductance of transformer 12 and an external resonant inductance. Resonant capacitor $C_{DR1}$ is in parallel with rectifying diode $D_{R1}$, whereas resonant capacitor $C_{DR2}$ is in parallel with rectifying diode $D_{R2}$. Another way of connecting the resonant capacitors is to place them across the secondary windings of transformer 12, i.e., between the anodes of $D_{R1}$ and $D_{R2}$, and the center tap of the transformer. Also, the same function can be achieved by using only one resonant capacitor connected between the anodes of $D_{R1}$ and $D_{R2}$. The topology and operation of the half-bridge zero-voltage-switched multi-resonant converter are in some aspects similar to those of the half-bridge zero-voltage-switched quasi-resonant converter. For a detailed analysis of a half-bridge zero-voltage-switched quasi-resonant converter see co-pending U.S. patent application Ser. No. 99,952, filed on Sept. 23, 1987 to Jovanovic et al and entitled OFF-LINE ZERO-VOLTAGE-SWITCHED QUASI-RESONANT CONVERTER.

Figure 12A:
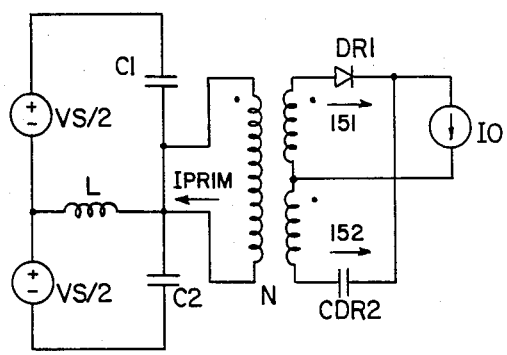
FIG. 12A is an equivalent circuit of the converter of FIG. 11 in a switch-resonant stage ($T_0$, $T_1$).
Figure 12B:
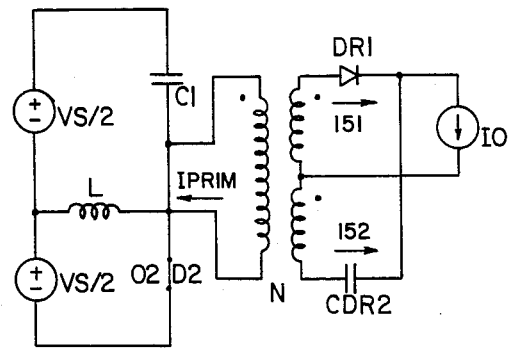
FIG. 12B is an equivalent circuit of the converter of FIG. 11 in a rectifier-capacitor-discharging stage ($T_1$, $T_2$).
Figure 12C:
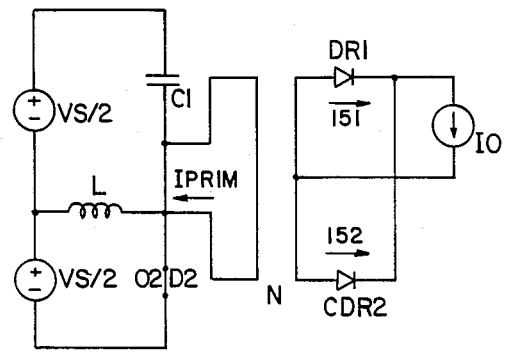
FIG. 12C is an equivalent circuit of the converter of FIG. 11 in an inductor-discharging stage ($T_2$, $T_3$).
Figure 12D:
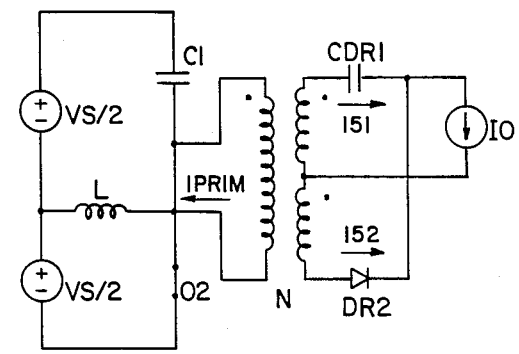
FIG. 12D is an equivalent circuit of the converter of FIG. 11 in a rectifier-resonant stage ($T_3$, $T_4$).
Figure 13:
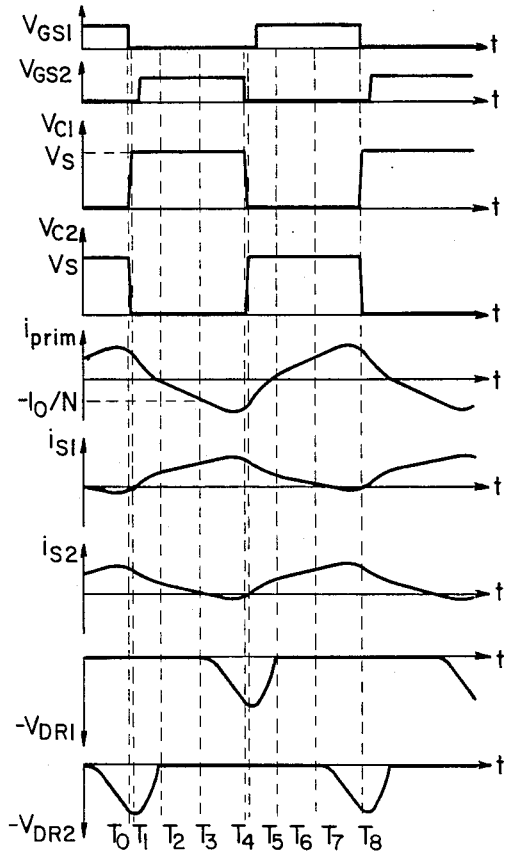
FIG. 13 shows a series of circuit waveforms used to explain the operation of the converter of FIG. 11.

There are several possible modes of operation of the half-bridge ZVS-MRC. The mode of operation which occurs under most input and load conditions is described below. FIGS. 12A through 12D show the equivalent circuit of the half-bridge ZVS-MRC in the four topological stages, whereas FIG. 13 shows typical waveforms used to describe the operation of the multi-resonant converter of FIG. 11.

In the switch-resonant stage ($T_0$, $T_1$) (FIG. 12A), prior to transistor $Q_1$ is on, capacitance $C_{DR2}$ and inductance L resonate. At $T=T_0$, transistor $Q_1$ is turned off. Since rectifier $D_{R2}$ is still reverse-biased, the equivalent circuit of the converter is as shown in FIG. 12A. During this stage, capacitance $C_1$ is charged in a resonant manner toward the supply voltage, whereas $C_2$ is discharged. The stage terminates at $T=T_1$, when voltage $V_{C2}$ becomes zero. Subsequently, transistor $Q_2$ should be switched on to achieve a lossless turn-on.

In the rectifier-capacitor discharging stage ($T_1$, $T_2$) (FIG. 12B), $C_{DR2}$ continues to resonate with inductance L. Due to a negative voltage across inductance L, the primary current decreases and becomes zero, and diode $D_{R2}$ becomes forward biased.

During the inductor-discharging stage ($T_2$, $T_3$) (FIG. 12C), both rectifiers conduct so that the primary voltage is zero and a negative voltage is applied to inductance L. As a result, the primary current decreases with a constant rate. The stage terminates at $T=T_3$, when the primary current becomes $-I_0/N$ and rectifier $D_{R1}$ ceases to conduct.

The rectifier-resonant stage ($T_3$, $T_4$) (FIG. 12D) is then entered into. At $T=T_3$, $C_{DR1}$ starts resonating with inductance L. This stage ends when switch $Q_2$ is turned off and a new conversion cycle is initiated. If switch $Q_2$ stays on for a longer time, the rectifier voltage may oscillate for several cycles. In this particular mode of operation, the DC voltage conversion ratio shows undesired positive slope characteristics. To avoid this mode of operation, it is necessary to limit the on-time duration (i.e., minimum switching frequency) to approximately one-half of the resonant period of the rectifier voltage.

Figure 14A:
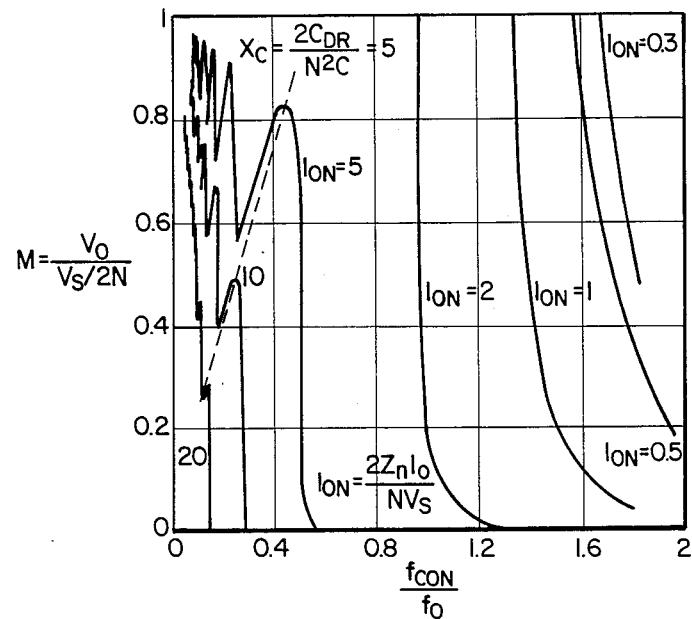
FIGS. 14A and 14B are graphs showing the DC voltage-conversion ratio of the converter of FIG. 11 as a function of the normalized conversion frequency.
Figure 14B:
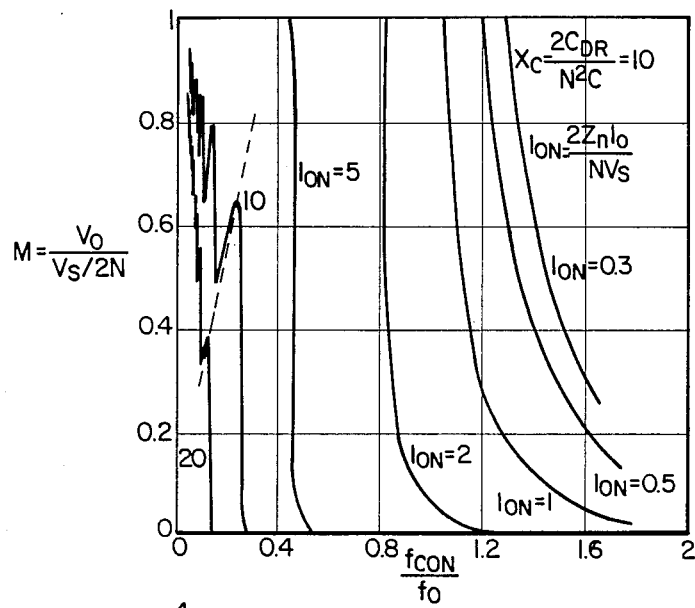

FIGS. 14A and 14B show the DC voltage conversion ratio as a function of the conversion frequency. These characteristics must be plotted with two parameters specified: $I_{ON}=2Z_nI_O/NV_S$, which is the normalized output current, and $X_C2C_{DR}/(N^2C)$, which is the ratio of the capacitance across the rectifiers reflected into the primary ($C_{DR}/(N/2)^2$) and the resonant capacitance of the primary (2C). It should be pointed out that for ZVS-MRCs it is difficult to plot the DC voltage conversion ratio with the normalized output resistance ($r=N^2R_L/Z_n$), as a running parameter. For FIG. 14A, $X_C=5$, whereas for FIG. 14B, $X_C=10$.

Examining FIGS. 14A and 14B, it is found that the conversion frequency must be higher than a certain frequency to ensure that the operating point of the converter does not go into the positive slope region. This limits the allowed operating region to the right of the dashed line in FIGS. 14A and 14B.

Figure 15:
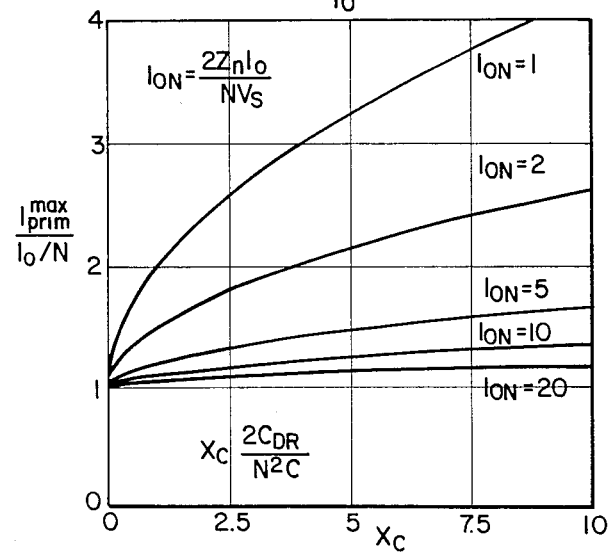
FIG. 15 is a graph showing the normalized primary peak current of the converter of FIG. 11 as a function of $X_C$.

It is not possible to obtain explicit closed-form solutions of the equations describing the operation of the ZVS-MRCs. Therefore, the design of the half-bridge ZVS-MRC is primarily based on the numerically calculated DC voltage conversion ratio characteristics shown in FIGS. 14A and 14B. The design guidelines for selecting the transformer turns ratio and the primary resonant capacitance are identical to those for half-bridge ZVS-QRC. To determine the values of the resonant inductor L and capacitance $C_{DR1}$ or $C_{DR2}$, it is necessary to use the DC voltage conversion ratio characteristics plotted for various $X_C$. Capacitance $C^*_{DR}$ is determined by selecting $X_C$, whereas inductance $L^*$ is determined by selecting $I_{ON}$ at low line and full load, i.e., $I_{ON}(max)=2Z_nI_O(max)/N^*V_S(min)$. Finally, the primary switches are selected according to the voltage and current ratings and the output capacitance. While the voltage across the non-conducting switch in the half-bridge ZVS-MRC is the same as in a half-bridge ZVS-QRC, the peak current in the half-bridge ZVS-MRC of FIG. 11 is somewhat higher than that in the half-bridge ZVS-QRC. FIG. 15 shows the normalized peak primary current in a half-bridge ZVS-MRC as a function of $X_C$. The maximum peak current occurs for $I_{ON}(max=2Z_nI_{ON}(max)/N^*V_S(min)$.

A specific embodiment of the half-bridge ZVS-MRC of FIG. 11 is designed with the following specifications:

$P_O=75$ W; $V_O=5$ V; $V_S=300$ V±50 V; and $f_{CON}>1$ MHz. Therefore, the turns ratio of the tranformer and the resonant capacitance for the half-bridge ZVS-MRC are assumed to be $N^*=16$ and $C^*=30$ pF. Using the available plot of the DC voltage conversion ratio for $X_C=5$, it follows that $C_{DR}\simeq20$ nF. Also, selecting $I_{ON}(max)=5$, the resonant inductor value is 25 H. From FIG. 15, for $X_C=5$ and $I_{ON}=I_{ON}(max)=5$, $I_{prim}(max)/(I_O(max)/N^*)\simeq1.44$ is obtained. Since $I_{prim}(max)=1.44*(15$ A$)/16=1.35$ A, the primary switches, $Q_1$ and $Q_2$, may be MOSFETs of the type made by International Rectifier Corporation and bearing Product No. IRF710. Estimated resonant frequency of the converter is $f_O\simeq4$ MHz. From FIG. 14A, the minimum conversion frequency (which occurs for $I_{ON}(max)=5$) is around 2 MHz.

The power stage of the half-bridge ZVS-MRC (FIG. 11), includes two 20 nF ($3\times6.8$ nF) NPO ceramic chip capacitors ($C_{DR1}$ and $C_{DR2}$) added in parallel to each rectifier ($DR_1$ and $DR_2$) and the transformer is rewound to increase the leakage inductance to $\simeq25$ H.

Compared to a half-bridge ZVS-QRC, the efficiency of the half-bridge ZVS-MRC is slightly lower. This can be attributed to a higher rms value of the primary and secondary currents, loss in the capacitors across the rectifiers and loss due to an increased transformer leakage. The converter operates with zero-voltage-switching in the load range from 10% to 100%. The conversion frequency varies from 1.5 MHz to slightly above 8

MHz. In use, it is possible to operate the converter at both full-load and no-load. Even though zero-voltage switching is lost, the switches are turned on with a relatively low voltage.

In ZVS-MRCs, all semiconductor devices are operated with no abrupt changes of the voltage across the devices. This technique permits utilization junction capacitances of all semiconductor devices and the transformer leakage inductance to form a multi-resonant tank network to implement zero-voltage switching for all semiconductor devices. Consequently, ZVS-MRCs can operate with a high conversion frequency and a wide-load range.

The efficiency of the specific embodiment of the half-bridge ZVS-MRC shown in FIG. 11 is 81.7% at full-load and low-line and 78.5% at full-load and high-line. However, the converter can be operated from full-load down to 10% of full-load with a conversion frequency from 1.5 MHz to 8 MHz.

The half-bridge ZVS-MRC has a potential to operate at yet higher frequencies (over 10 MHz). Practically, the main obstacle in achieving this is the relatively high output capacitance of today's available MOSFET devices and a lack of adequate core materials for very high-frequency power transformers.

From the above, it is apparent that many modifications and variations of the present invention are possible in light of the above teachings. It is therefore to be understood that, within the scope of the appended claims, the invention may be practiced otherwise than as specifically described.

What is claimed is:

1. A device for converting an input signal from a supply to a DC output signal to be imposed across a load, said device comprising:
   input terminals for receiving the input signal;
   output terminals for imposing said DC output signal across the load;
   first and second switching means connected in series, said serially connected first and second switching means connected in parallel across said input terminals, each of said first and second switching means including in parallel a transistor switching means, a diode means and a capacitor means;
   transformer means having a primary winding, and serially connected first and second secondary windings;
   a first rectifying means for connecting said first secondary winding across said output terminals;
   a first resonant capacitor means in parallel with said first rectifying means;
   a second rectifying means for connecting said second secondary winding across said output terminals;
   a second resonant capacitor means in parallel with said second rectifying means;
   means for connecting the primary winding of said transformer to said input terminals and the serial connection between said first and second switching means; and
   a resonant circuit formed from said first and second resonant capacitor means and the total inductance of the primary winding of said transformer.

2. The device of claim 1, wherein the capacitance of said first and second capacitor means constitutes the junction capacitance of said first and second transistor means, respectively.

3. The device of claim 1, further comprising driving means for driving said first and second transistor switching means at a predetermined frequency.

4. The device of claim 1, wherein said first resonant capacitor means comprises the junction capacitance of said first rectifying means and said second resonant capacitor means comprises the junction capacitance of said second rectifying means.

5. The device of claim 4, wherein said first and second rectifying means comprise a first diode and a second diode, respectively.

6. The device of claim 5, wherein said first resonant capacitor means further comprises a first external capacitor arranged in parallel with said first diode and said second resonant capacitor means further comprises a second external capacitor arranged in parallel with said second diode.

* * * * *